US009323566B2

(12) United States Patent
Hatta et al.

(10) Patent No.: US 9,323,566 B2
(45) Date of Patent: Apr. 26, 2016

(54) VIRTUAL COMPUTER SYSTEM FOR RESTORING NETWORK CONNECTION OF LIVE-MIGRATED VIRTUAL COMPUTER

(75) Inventors: Yukari Hatta, Tokyo (JP); Norimitsu Hayakawa, Tokyo (JP); Hiroshi Miki, Tokyo (JP); Shiro Nohara, Tokyo (JP); Takao Totsuka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/408,441

(22) PCT Filed: Aug. 22, 2012

(86) PCT No.: PCT/JP2012/071217
§ 371 (c)(1),
(2), (4) Date: Dec. 16, 2014

(87) PCT Pub. No.: WO2014/030229
PCT Pub. Date: Feb. 27, 2014

(65) Prior Publication Data
US 2015/0121372 A1    Apr. 30, 2015

(51) Int. Cl.
*G06F 9/455*    (2006.01)
*G06F 9/54*    (2006.01)

(52) U.S. Cl.
CPC .............. *G06F 9/45558* (2013.01); *G06F 9/54* (2013.01); *G06F 2009/45579* (2013.01)

(58) Field of Classification Search
None
See application file for complete search history.

(56) References Cited

U.S. PATENT DOCUMENTS

| 2005/0268298 A1* | 12/2005 | Hunt | G06F 9/4856 718/1 |
| 2009/0292858 A1* | 11/2009 | Lambeth | H04L 29/12839 711/6 |
| 2011/0145471 A1* | 6/2011 | Corry | G06F 9/4856 711/6 |
| 2011/0238820 A1 | 9/2011 | Matsuoka | |
| 2012/0131576 A1 | 5/2012 | Hatta et al. | |

FOREIGN PATENT DOCUMENTS

| JP | 2011-198299 A | 10/2011 |
| JP | 2012-108816 A | 6/2012 |

OTHER PUBLICATIONS

PCT International Search Report on application PCT/JP2012/071217 mailed Sep. 18, 2012; 1 page.

* cited by examiner

*Primary Examiner* — Craig Dorais
(74) *Attorney, Agent, or Firm* — Foley & Lardner LLP

(57) ABSTRACT

The network connection of a VM (target VM) that has been live-migrated from a first physical computer to a second physical computer is restored in a virtual computer system in which communication is performed using a certain type of information outside the jurisdiction of a virtualization mechanism. When receiving a packet from the VM, the first virtualization mechanism of the first physical computer extracts a certain type of information from the packet and registers the extracted certain type of information in a first management information unit. The first virtualization mechanism transmits the certain type of information in the first management information unit to the second virtualization mechanism of the second physical computer during live migration. The second virtualization mechanism registers the certain type of information in a second management information unit and transmits a certain type of packet including the certain type of information from at least one of one or more physical I/O devices of the second physical computer in order to restore the network connection of the target VM.

9 Claims, 10 Drawing Sheets

Fig. 2

| Management table #11 of VNIC #11 of LPAR #1 | |
|---|---|
| VMAC address | 00:00:87:00:00:01 |
| OS registration MAC address 1 | 00:00:87:00:00:01 |
| ... | ... |
| OS registration MAC address n | 00:00:87:00:00:05 |

| Management table #12 of VNIC #12 of LPAR #1 | |
|---|---|
| VMAC address | 00:00:87:00:00:02 |
| OS registration MAC address 1 | 00:00:87:00:00:01 |
| ... | ... |
| OS registration MAC address n | 00:00:87:00:00:06 |

Fig. 3

| Destination MAC address | Transmission source MAC address | Type | Data | Error detection |
|---|---|---|---|---|
| 6 bytes | 6 bytes | 2 bytes | 46 to 1500 bytes | 4 bytes |

Fig. 4

VLAN tag

| Destination MAC address | Transmission source MAC address | TPID | TCI | Type | Data | Error detection |
|---|---|---|---|---|---|---|
| 6 bytes | 6 bytes | 2 bytes for each | | | 46 to 1500 bytes | 4 bytes |

Fig. 5

| Destination MAC address | Transmission source MAC address | Type | Data of RARP protocol | Error detection |
|---|---|---|---|---|
| 6 bytes | 6 bytes | 2 bytes | | 4 bytes |

| # | Contents | Specific example |
|---|---|---|
| 1 | MAC Address | 00:00:87:00:00:01 |
| 2 | VLAN ID | 1 |
| 3 | VNIC ID | 1 |
| 4 | Update time point | 2012/06/28 10:00:00 |

Fig. 12

(Before migration)

| MAC: 00:00:87:00:00:01 |
|---|
| VLAN ID:  1 |
| VNIC ID:1 |
| 2012/06/28 10:00:00 |
| MAC: 00:00:87:00:00:01 |
| VLAN ID:  2 |
| VNIC ID:1 |
| 2012/06/28 08:00:00 |
| MAC: 00:00:87:00:00:03 |
| VLAN ID:  3 |
| VNIC ID:11 |
| 2012/06/28 07:00:00 |

Segment 1

Entry of VNIC ID (e.g., ID = 1) used by target LPAR (After migration)

| Empty |
|---|
|  |
|  |
|  |
| Empty |
|  |
|  |
|  |
| 00:00:87:00:00:03 |
| 3 |
| 11 |
| 2012/06/28 07:00:00 |

Segment 1

Fig. 13

(Before migration)

| Empty |
|---|
|  |
|  |
|  |
| Empty |
|  |
|  |
|  |
| MAC: 00:00:87:00:00:09 |
| VLAN ID:  1 |
| VNIC ID:8 |
| 2012/06/28 09:00:00 |

Segment 1

Entry of virtual VNIC ID (e.g., ID = 1) used by target LPAR (After migration)

| MAC: 00:00:87:00:00:01 |
|---|
| VLAN ID:  1 |
| VNIC ID:9 |
| 2012/06/28 10:00:00 |
| MAC: 00:00:87:00:00:01 |
| VLAN ID:  2 |
| VNIC ID:9 |
| 2012/06/28 08:00:00 |
| MAC: 00:00:87:00:00:09 |
| VLAN ID:  1 |
| VNIC ID:8 |
| 2012/06/28 09:00:00 |

Segment 1

Fig. 14

| MAC address | VLAN | Packet transfer destination port |
|---|---|---|
| 00:00:87:00:00:01 | 1(None specified) | portB |

Fig. 15

| MAC address | VLAN | Packet transfer destination port |
|---|---|---|
| 00:00:87:00:00:01 | 1(None specified) | portD |

VIRTUAL COMPUTER SYSTEM FOR RESTORING NETWORK CONNECTION OF LIVE-MIGRATED VIRTUAL COMPUTER

TECHNICAL FIELD

The present invention relates to the live migration of a virtual computer.

BACKGROUND ART

By a virtualization mechanism like a hypervisor provided in a physical computer, one or more virtual computers are constructed in the physical computer. There has been known live migration (that will be referred to as "LM") technology in which a virtual computer in operation is migrated from a first physical computer to a second physical computer (for example, PTL 1).

In the following description, a physical computer that serves as a LM source will be referred to as a "first physical computer," the virtualization mechanism provided in the first physical computer will be referred to as a "first virtualization mechanism," a physical computer that serves as a LM destination will be referred to as a "second physical computer," a virtual NIC (Network Interface Card) will be referred to as a "VNIC," a virtualization mechanism provided in the second physical computer will be referred to as a "second virtualization mechanism," a virtual computer (virtual machine) that serves as a LM target will be referred to as a "target VM," the VNIC managed by the first virtualization mechanism and allocated to the target VM before the LM will be referred to as a "first VNIC," and the VNIC managed by the second virtualization mechanism and allocated to the target VM after the LM will be referred to as a "second VNIC."

CITATION LIST

Patent Literature

[PTL 1]
Japanese Patent Application Publication No. 2012-108816

SUMMARY OF INVENTION

Technical Problem

At the LM, even when the upper-level machine of the target VM (for example, a physical or virtual computer that accesses the target VM or a virtual computer that operates on the target VM) exists, it is required to migrate the target VM without being noticed by the upper-level machine. Thus, the connection between the target VM and an external environment is required to be restored after the LM.

Network connection information on the external environment includes, for example, a MAC address table provided in a PSW (physical network switch). The MAC address table has information indicating which port of the PSW is coupled to the machine having a destination MAC address allocated thereto.

After the LM, the MAC address table is required to be updated. The update is performed when the second virtualization mechanism issues an RARP (Reverse Address Resolution Protocol). The RARP is a protocol for acquiring an IP address using the MAC address.

Specifically, a MAC address #X of the first VNIC and a MAC address #Y of the second VNIC are exchanged with each other between the first and second virtualization mechanisms. The second virtualization mechanism broadcasts the RARP packet in which the MAC address #X of the second virtualization mechanism is specified. An RARP server on a network receives the RARP packet and returns an IP address #K corresponding to the MAC address #X to the second virtualization mechanism in response to the RARP packet. Thus, the second physical computer is allowed to perform communication using the IP address #K. Although the RARP packet is relayed via the PSW, the PSW updates identification information on a port corresponding to the MAC address #X in the MAC address table to identification information on the port thereof having received the RARP packet. Thus, the corresponding relationship between the MAC address #X and the port is updated, and the network connection of the target VM after the LM is restored.

However, before the LM, a MAC address different from the MAC address of the first VNIC may be used in the communication of the target VM outside the jurisdiction of the first virtualization mechanism.

As an example, there is an environment in which a technology called Teaming is applied. The Teaming is the technology in which a plurality of ports of one or more NICs allocated to a computer is bundled together to be used as one port to attain load dispersion, an improvement in band, and an improvement in fault tolerance. When the technology is applied to the VNICs, a plurality of ports (a plurality of ports configured to have the Teaming) related to the one or more VNICs is used as a package, and at least one of the following events is performed.

(*) When a failure occurs in a first port of the plurality of ports, the first port is logically separated and communication is continuously performed using a second port of the plurality of ports.

(*) Transmission and reception are performed in a shared fashion for communication with a plurality of communication parties via the plurality of ports, which in turn increases a band width or disperses a load.

The MAC address used in the Teaming may be a MAC address different from the MAC address allocated to the VNIC. The MAC address used by the OS (guest OS) of the virtual computer is changed independently of the virtualization mechanism.

Then, the MAC address used by the guest OS is registered in the address table of the PSW. Specifically, for example, when receiving a packet from an outside, the PSW registers a MAC address and the ID of the port (the port of the PSW) having received the packet in the MAC address table if the MAC address included in the received packet does not exist in the MAC address table.

Therefore, there may be a case in which a correct MAC address (specifically, the same MAC address as the MAC address registered in the MAC address table of the PSW) cannot be specified in the RARP packet transmitted from the second virtualization mechanism after the LM. In this case, the network connection of the target VM cannot be restored.

The above matter is not limited to the MAC address but may be caused in other cases in which information different from information managed by the first virtualization mechanism is used in the communication of the target VM. For example, a case in which the target VM uses a tag VLAM (Virtual LAN) is considered as such (LAN is an abbreviation of Local Area Network). Although communication via the tag VLAN uses a VLAN tag (information including a VLAN ID or the like), the virtualization mechanism does not know the VLAN tag used by the target VM. Such a case gives rise to the problem that the network connection of the target VM cannot be restored after the LM as described above even if the MAC address of the guest OS is the same as the MAC address of the VNIC.

As a method for preventing such a problem, there is considered a method in which a manager manually inputs information such as the MAC address or the VLAN tag used by the target VM to the virtualization mechanism via a management console. However, there is a likelihood that erroneous information is input or information is erroneously input. In this case, the network connection of the target VM cannot be restored after the LM.

In addition, there is a case in which the manager of the virtualization mechanism has difficulty in managing the operation of the virtual computer or its upper-level machine. Such a case includes a case in which a PaaS (Platform as a Service) is provided under a cloud environment. Generally, the manager of the virtualization mechanism does not understand how the virtual computer or its upper-level machine is operated. Therefore, when the manager manually inputs information used by the virtual computer, the user of the virtual machine or its upper-level machine and the manager of the virtualization mechanism are required to cooperate each other.

Solution to Problem

A first virtualization mechanism has a first management information unit, and a second virtualization mechanism has a second management information unit. The first virtualization mechanism extracts a certain type of information from a packet when receiving the packet from a virtual computer and registers the extracted certain type of information in the first management information unit. The first virtualization mechanism transmits the certain type of information in the first management information unit to the second virtualization mechanism at LM. The second virtualization mechanism registers the certain type of information in the second management information unit and transmits a certain type of packet including the certain type of information from at least one of the one or more physical I/O devices of the second physical computer to restore the network connection of the live-migrated virtual computer.

Advantageous Effects of Invention

Even under an environment in which communication is performed using information outside the jurisdiction of a virtualization mechanism, it is possible to restore the network connection of a live-migrated virtual computer without the manual input of the information outside the jurisdiction by a user. Since the manager of the virtualization mechanism is not required to manually input the information outside the jurisdiction, the user of the virtual computer or its upper-level machine and the manager of the virtualization mechanism are not required to cooperate each other to input the information.

BRIEF DESCRIPTION OF DRAWINGS

FIG. 2 shows an example of a management table #11 of a VNIC #11 and a management table #12 of a VNIC #12.

FIG. 3 shows a configuration example of a packet transmitted from an LPAR 128 that does not use a tag VLAN.

FIG. 4 shows a configuration example of a packet transmitted from the LPAR 128 that uses the tag VLAN.

FIG. 5 shows a configuration example of an RARP packet transmitted when the LPAR 128 that serves as a LM target is the LPAR 128 that does not use the tag VLAN.

FIG. 12 shows an example of a MAC address learning table #11 before and after the LM of a VSW #11 in a hypervisor #1 that serves as a LM source.

FIG. 13 shows an example of a MAC address learning table #21 before and after the LM of a VSW #21 in a hypervisor #2 that serves as a LM destination.

FIG. 14 shows an example of a MAC address table #1 before the LM in the PSW #1.

FIG. 15 shows an example of the MAC address table #1 before the LM in the PSW #1.

DESCRIPTION OF EMBODIMENTS

Hereinafter, an embodiment will be described with reference to the drawings.

On this occasion, when a plurality of the same types of constituents is described without distinction, the reference signs of the constituents are used. On the other hand, when the same types of the constituents are described distinctively, serial numbers assigned to the constituents are used instead of the reference signs. For example, a plurality of physical computers is expressed as "physical computers 101" when they are described without distinction and expressed as a "physical computer #1" and a "physical computer #2" when they are described distinctively.

In addition, aaa information will be described below using the name of an aaa table as an example. However, information is not limited to a table form and may be in the form of any type.

Figure 1:
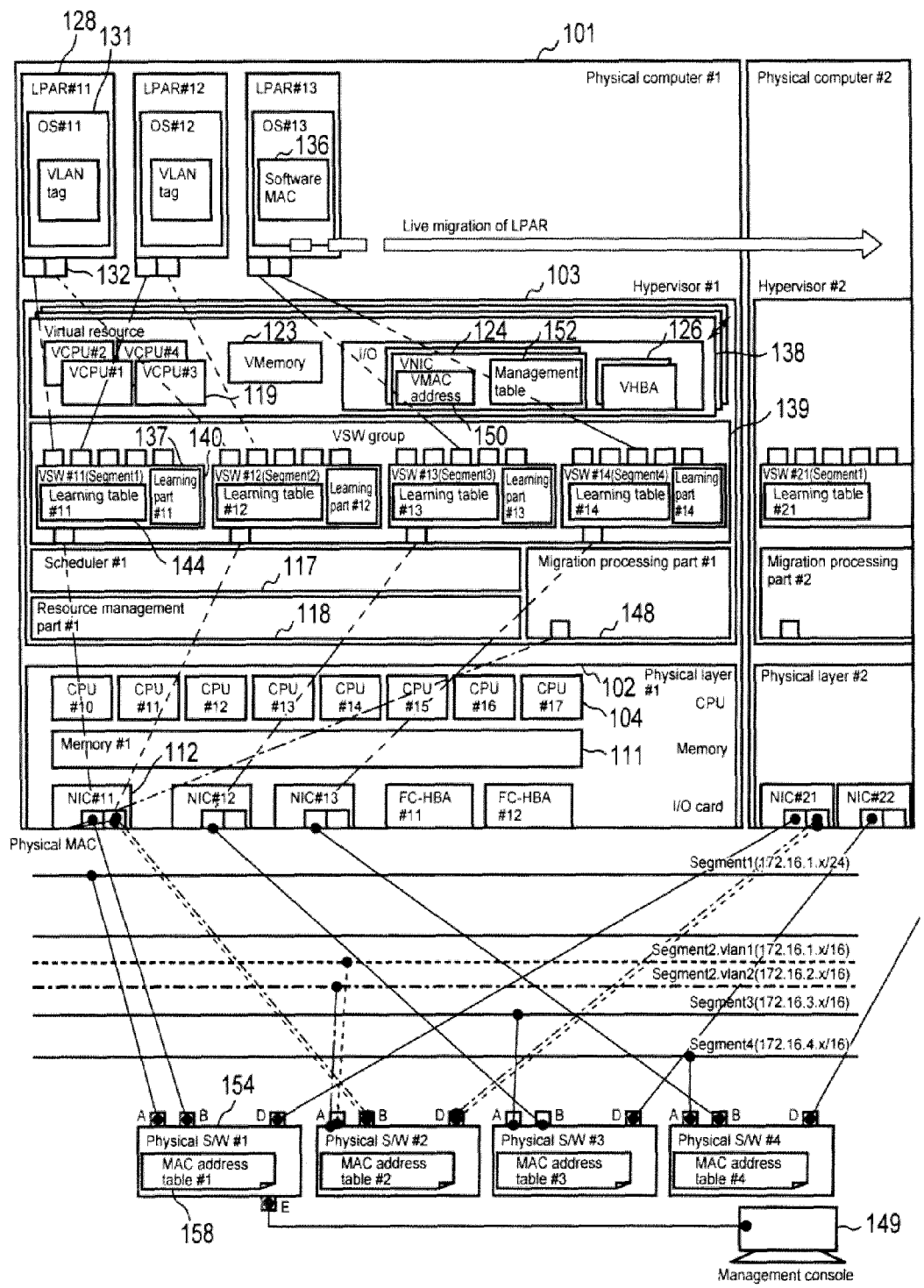
FIG. 1 shows an example of a virtual computer system and its external environment according to an embodiment.

FIG. 1 shows an example of a virtual computer system and its external environment according to the embodiment.

The virtual computer system includes a plurality of physical computers 101. The external environment of the virtual computer system includes, for example, a plurality of PSWs 154 and a management console 149.

The physical computer 101 has a physical layer (physical resource) 102. The physical layer 102 includes one or more CPUs 104, one or more memories 111, and one or more physical I/O (Input/Output) devices. The physical I/O device is, for example, an interface device to perform communication via a communication network and may be connected to the communication network. The one or more physical I/O devices include, for example, three physical NICs 112 and two FC (Fibre Channel)-HBAs (Host Bus Adaptors) 115. In the shown example, for a physical computer #1, a port #A of a PSW #1 is coupled to a first port of an NIC #11, a port #B of a PSW #3 is coupled to a first port of an NIC #12, and a port #B of a PWS #4 is coupled to a first port of an NIC #13. For a physical computer #2, a port #D of the PSW #1 is coupled to a first port of an NIC #21, and a port #D of the PSW #3 is coupled to a first port of an NIC #22.

In the physical computer 101, a hypervisor 103 is realized when at least one of the CPUs 104 of the physical layer 102 executes a computer program for example, firmware). The hypervisor 103 is a mechanism capable of operating a plurality of virtual computers on one physical computer 301 by logically partitioning the physical layer 102 (the CPUs 104, the memories 111, and the I/O devices (the NICs 112 and the FC-HBAs 115)) and allocating a plurality of virtual resources obtained by the logical partition to a plurality of LPARs (Logical Partitions), respectively. The number of the virtual resources is the same as that of the LPARs, and the virtual resources are allocated to the LPARs on a one-to-one basis. Since the virtual computers are realized when the virtual resources are allocated to the LPARs, they will be referred to as the "LPARs" in the embodiment below. Each one of the virtual resources allocated to each one of the LPARs 128 includes, for example, one or more VCPUs (virtual CPUs) 119 based on the one or more CPUs 104, one or more VMEMs (virtual memories) 123 based on the one or more memories 111, and one or more virtual I/O devices based on the one or more I/O devices. The one or more virtual I/O devices include, for example, one or more VNICs 124 based on the one or more NICs 112 and/or one or more VHBAs (virtual HBAs) 126 based on the one or more FC-HBAs 115.

The LPAR 128 executes an OS (guest OS) 131. When transmitting a packet, the guest OS 131 causes the packet to include a certain type of information. The certain type of information includes, for example, a MAC address used by the guest OIS 131 and/or a VLAN tag. The VLAN tag is included in the packet transmitted from the guest OS 131 when the guest OS 131 uses a tag VLAN to perform communication. The packet transmitted from the guest OS 131 is transmitted from the VNIC 124 or the VHBA 126 allocated to the LPAR 128 that executes the guest OS 131. Further, the MAC address included in the packet may be a MAC address (that will be referred to as a "software MAC" in some cases) uniquely used by the guest OS 131 and different from the MAC address of the VNIC.

The packet transmitted from the LPAR 128 is received by at least one of the plurality of PSWs 154. The PSW 154 is a physical network switch. The PSW 154 has a plurality of ports (physical ports), a MAC address table 158 (exactly, a memory-like storage device that stores the MAC address table 158), and a processor not shown. The MAC address table 158 is an example of address management information expressing the corresponding relationship between the ID of the physical port of the PSW 154 having the table 158 and the MAC address. The "corresponding relationship" described here expresses which of the physical ports is coupled to the guest OS. Therefore, the ID of the physical port registered in the MAC address table 158 can be expressed as the ID of the physical port to which the packet is transferred. As shown in FIG. 14 for example, the MAC address table 158 has the combination of the MAC address, the VLAN ID as an example of a part of a VLAN tag, and the ID of the physical port (FIG. 14 is an example of the MAC address table #1 of the PSW #1).

When receiving the packet, the PSW #1 (the processor of the PSW #1) registers, in the MAC address table #1, the combination of a target MAC address, a target VLAN ID (the VLAN ID of the VLAN tag included in the packet), and the ID of a target physical port (the physical port having received the packet) if the target MAC address (the MAC address included in the received packet) does not exist in the MAC address table #1. If the target VLAN ID does not exist, a value indicating no specification is registered in the MAC address table #1 as the VLAN ID. In addition, although the target MAC address exists in the MAC address table #1 of the PSW #1 (the processor of the PSW #1) the PSW #1 updates the ID of the physical port corresponding to the target MAC address in the MAC address table #1 to the ID of the target physical port if the ID of the physical port corresponding to the target MAC address is different from the ID of the target physical port. In addition, when receiving the packet, the PSW #1 (the processor of the PSW #1) adds a new entry and registers the target MAC address and the target VLAN ID in the entry if the target MAC address exists in the MAC address table #1 and the VLAN ID corresponding to the target MAC address is different from the target VLAN ID. By such a function of the PSW #1, the MAC address (and the VLAN tag) used by the guest OS is (are) registered in the MAC address table #1. Therefore, if the MAC address is a software MAC, the software MAC is registered instead of the MAC address of the VNIC 124 of the LPAR 128. Note that the other PSWs 128 also have the same function as that of the PSW #1.

The hypervisor 103 has a scheduler 117, a resource management part 118, a migration processing part 148, a plurality of VSWs (virtual switches) 137, and the one or more virtual resources descried above.

The scheduler 117 performs the logical partition of the physical layer 102, and the resource management part 118 manages a resource such as a physical resource that serves as the physical layer 102. Each of the plurality of virtual resources (for example, the VCPUS 119, the VMEMs 123, the VNICs 124, and the VHBAs 126) obtained by the logical partition of the physical layer 102 (the physical resource) can be allocated to the plurality of LPARs 128 by the scheduler 117 and the resource management part 118.

The VNIC 124 has a virtual MAC address allocated by the hypervisor 103. In addition, the VNIC 124 has a management table 152 including information on the VNIC 124 as well as the virtual MAC address. The management table 152 is provided for each of the VNICs 124. Hereinafter, as the management table 152, the management table of each of VNICs #11 and #12 allocated to the LPAR #11 will be taken as an example.

FIG. 2 shows an example of a management table #11 of the VNIC #11 and a management table #12 of the VNIC #12.

The management table #11 includes the virtual MAC address of the VNIC #11 and one or more OS registration MAC addresses, which are one or more MAC addresses that can be used by a guest OS #11 of the LPAR #11 (that is, one or more MAC addresses that can be used as MAC addresses included in the packet via the VNIC #11). The OS registration MAC addresses may have the same value as that of the virtual MAC address of the VNIC #11.

The MAC addresses included in the packet transmitted from the guest OS #11 are registered in the management table #11. The hypervisor 103 can recognize the MAC addresses registered by the guest OS #11 by referring to the management table #11.

For example, when the Teaming is configured as for the VNICs #11 and #12, some of the used OS registration MAC addresses may be the same as shown in FIG. 2 (for example, the MAC address 00:00:87:00:00:01) although the VNICs #11 and #12 have the different virtual MAC addresses as shown in the management tables #11 and #12 of FIG. 2. It seems that the OS registration MAC addresses are only required to be used at the Teaming. However, since it is hard to know which of the MAC addresses is used for the hypervisor 103 by the guest OS at the Teaming, the registration MAC addresses cannot be used the plurality of common MAC addresses may be registered as in FIG. 2).

Reference will be made to FIG. 1 again. As described above, the guest OS 131 operates in the LPAR 128. Like a guest OS #13 of an LPAR #13, the guest OS 131 that does not use the VLAN tag transmits the packet that does not include the VLAN tag as shown in FIG. 3. Like the guest OS #11 of the LPAR #11 and a guest OS #12 of an LPAR #12, the guest OS 131 that uses the tag VLAN transmits the packet including the VLAN tag as shown in FIG. 4. Each type of the packets shown in FIGS. 3 and 4 includes a destination MAC address and a transmission source MAC address. The destination MAC address is a MAC address specified as a transmission destination by the guest OS 131 of the LPAR 128 that serves as a transmission source, and the transmission source MAC address is a MAC address specified as a transmission source by the guest OS 131 of the LPAR 128 that serves as the transmission source. For example, the packet (that will be referred to as the VLAN unused packet) transmitted from the guest OS that does not use the tag VLAN has the destination MAC address in the first field (for example, the first six-byte field) thereof, the transmission source MAC address in the second field (for example, the next six-byte field) thereof, information indicating the type of the packet (for example, a number for identifying a protocol) in the third field (for example, the next two-byte field) thereof, data in the fourth field (for example, the next 46-to-1500-byte field) thereof, and a code for detecting an error in the fifth field (for example, the last four-byte field) thereof. On the other hand, the packet (that will be referred to as the VLAN using packet) transmitted from the quest OS that uses the tag VLAN is almost the same as the VLAN unused packet except that it has a sixth field (for example, four bytes) between the second field and the third field. The sixth field has the VLAN tag. Specifically, for example, the first-half part (for example, two bytes) of the sixth field has a TPID (Tag Protocol Identifier), and the second-half part (for example, two bytes) thereof has TCI (Tag Control Information) The value of the TPID is set at "0x8100" at the use of the tag VIM, The TCI is information including information such as the VLAN ID and the priority of the packet. Information including both of the TPID and the TCI is called the VLAN tag.

As described above, like the LPARs #11 and #12 for example, the LPARs 128 that use the tag VLAN transmit the packet including the VLAN tag with information such as the VLAN ID. In addition, like the LPAR #13 for example, from the LPAR 128 that performs the Teaming to make a network redundant, the guest OS may transmit the packet including the MAC address different from the virtual MAC address of the VNIC 152.

By a hypervisor #1, the LPAR 128 in operation may be live-migrated from the physical computer #1 to the physical computer #2. For example, when the LPAR #13 is live-migrated, it is migrated to the physical computer #2. Then, when a hypervisor #2 of the physical computer #2 transmits a RARP (Reverse Address Resolution Protocol), a MAC address table #3 of the PSW #3 and a MAC address table #4 of the PSW #4 are updated, whereby the network connection of the LPAR #13 can be restored (substantially taken over)

According to the embodiment, even if the live-migrated LPAR 128 transmits a packet including a software MAC different from the virtual MAC address of the VNIC (or even if the LPAR 128 transmits a packet including a VLAN tag), at least the hypervisor #1 inside the physical computer #1 that serves as a LM source has a learning function to extract a certain type of information from the packet of the LPAR 128 and hold the same such that the network connection can be restored after the LPAR 128 is live-migrated (in other words, the network connection can be taken over with the LM). The certain type of information includes, for example, at least one (typically both) of a MAC address (a transmission source MAC address) and at least some (for example, the VLAN ID)
of a VLAN tag. The learning function described above is provided in a MAC learning part 140. The MAC learning part 140 performs MAC address learning in which a MAC address (a transmission source MAC address) and a VLAN ID are extracted and managed.

The hypervisor 103 has the VSW (virtual switch) 137 for each of virtual network segments constructed by the hypervisor 103 itself. The VSW 137 corresponds to the port of the physical NIC 112.

Each of the VSWs 137 has a plurality of virtual ports, a MAC learning part 140, and a MAC address learning table 144. The plurality of virtual ports of each of the VSWs #137 includes a virtual port coupled to the VNIC 124 allocated to the LPAR 128 and a virtual port allocated to the physical NIC 112 of the physical computer 101. The MAC learning part 140 performs the MAC address learning. For example, when the VSW #11 receives a packet from the LPAR #11 (the guest OS #11) to which the VNIC coupled to the VSW #11 is allocated, a MAC learning part #11 of the VSW #11 extracts a MAC address (a transmission source MAC address) and a VLAN ID from the packet and registers the extracted information (for example, the MAC address and the VLAN ID) in the MAC address learning table #11. Thus, the information (the MAC address and the VLAN ID) registered in the MAC address learning table 140 depends on the packet received by the VSW 137 having the MAC address learning table 140.

According to the configuration exemplified in FIG. 1, at least one VSW 137 is coupled to the VNIC 124 allocated to the LPAR 128, at least one physical NIC 112 is coupled to the VSW 137, at least one PSW 154 is coupled to the physical NIC 112, and a network segment corresponding to the VSW (virtual network segment) 137 coupled to the PSW 154 via the physical NIC 112 is coupled to the PSW 154.

The network segment may be, for example, the subnet of a LAN or a VLAN (tag VLAN). For example, a packet transmitted from the guest OS #13 is received by the PSW #3 coupled to an NIC #2 via the VNIC 124 allocated to the LPAR #13, the VSW #13 coupled to the VNIC 124, and the NIC #2 coupled to the VSW #13. The PSW #3 specifies the IDs of the physical ports corresponding to the destination MAC address of the received packet from the MAC address table #3 and outputs the received packet from the specified physical port #A or #D. Thus, the packet is transmitted to an external apparatus via a network segment #3 coupled to the PSW #3 or transmitted to the LPAR 128 of the physical computer #2.

Since the VSW 137 corresponds to a network segment, the plurality of VSWs 137 corresponding to the same network segment exists in the plurality of physical computers 101. For example, the VSWs #11 and #21 corresponding to the same network segment #1 exist in the physical computers #1 and #2.

The management console 149 may be, for example, a computer like a personal computer. The management console 149 is coupled to, for example, at least one (tor example, the PSW #1) of the plurality of PSWs 154. The management console 149 issues a LM start request to both of the physical computer #1 that serves as a LM source and the physical computer #2 that serves as a LM destination via the PSW #1 to start the LM. The LM start request may be issued only to the physical computer #1 (or #2), and then the physical computer #1 (or #2) may issue the LM start request to the other physical computer #2 (or #1). The migration processing part #1 transfers the data of the LPAR #128 that serves as a LM target to a migration processing part #2 via an NIC #1 to realize the LM of the LPAR 128. At the LM start request, the LPAR 128 (for example, the LPAR #13) that serves as the LM target and a migration method are specified. If the specified LPAR 128 is in operation and the specified method is the LM, the LM is executed. If the specified LPAR 128 is not in operation in spite of the specified method LM, the LM fails. The migration processing part 148 according to the embodiment can perform, as well as the LM, other migrations, for example, a shutdown migration in which the LPAR 128 that serves as the migration target is migrated in a state in which the guest OS 131 of the LPAR 128 that serves as the migration target is shut down. In order to perform the shutdown migration, it is required to specify the shutdown migration as the migration method.

When the LPAR 128 is live-migrated to the physical computer #2, the migration processing part #2 of the physical computer #2 that serves as the LM destination transmits an RARP packet.

FIG. 5 shows a configuration example of the RARP packet transmitted when the LPAR 128 that serves as a LM target is the LPAR 128 that does not use a tag VLAN.

As is clear from FIG. 5, the configuration of the packet is the same as that of the packet shown in FIG. 3. A value (for example, 0x8035) indicating the RARP is written in a third field (a field in which a type is written), and data (a value complying with an RARP packet configuration) on the RARP is written in a fourth field (a field having data).

Figure 6:
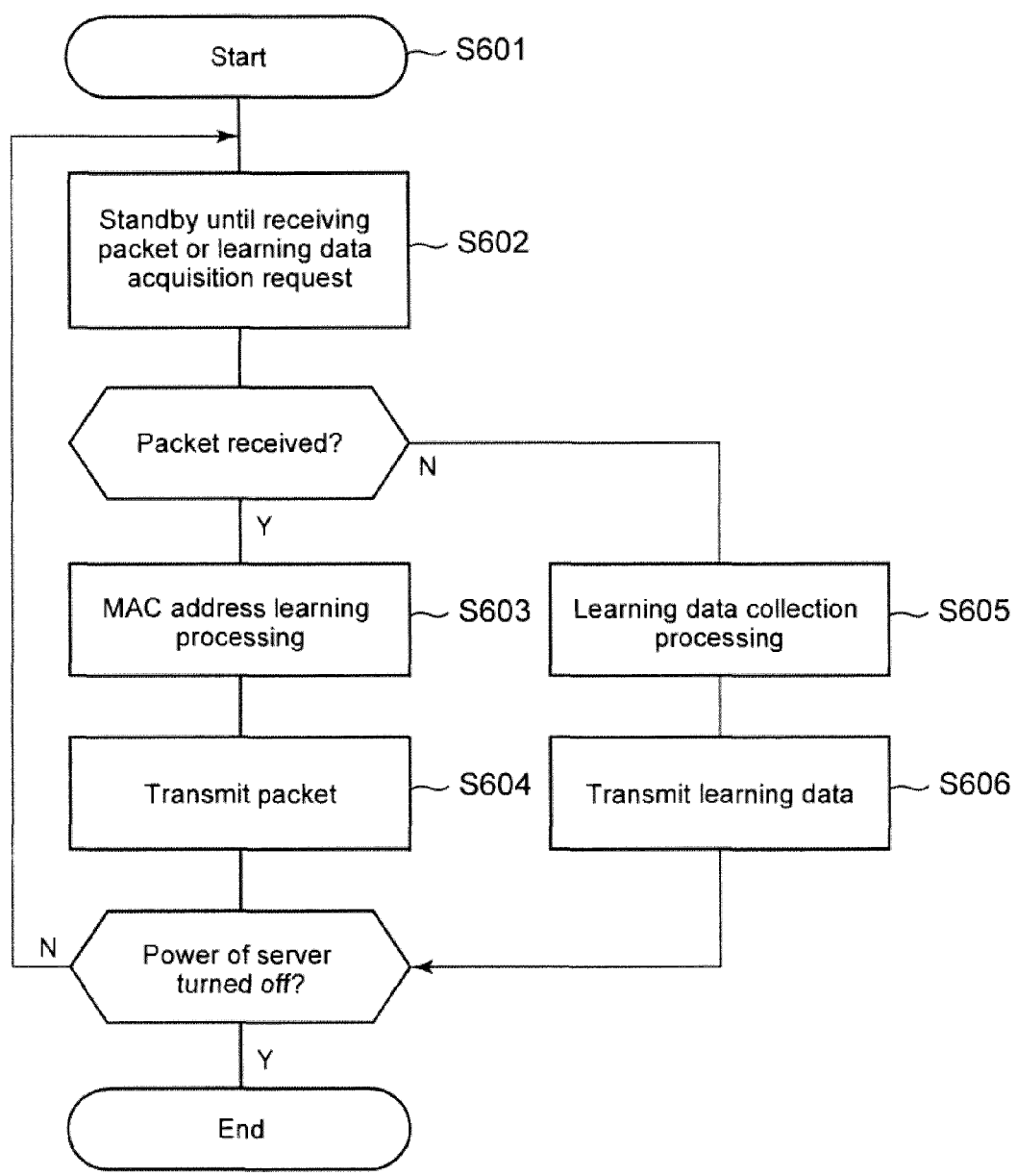
FIG. 6 shows the flow of processing performed by a VSW 137 of a hypervisor 103.

FIG. 6 shows the flow of processing performed by the VSW 137 of the hypervisor 103.

The processing of FIG. 6 is common processing performed by all the VSWs 137 after the physical computers 101 start and the hypervisors 103 construct the VSWs 137. Specifically, the processing of FIG. 6 is performed regardless of whether the physical computer 101 having the VSW 137 is the LM source or the LM destination of the LPAR 128. The processing of FIG. 6 is applied to all the VSWs 137. However, since the LM target of the embodiment is the LPAR #13, the processing of FIG. 6 will be described taking the VSW #13 as an example.

(S601) When power is applied to the physical computer #1 to start the hypervisor #1 and construct the VSW #13, the processing of VSW #13 is started.

(S602) The VSW #13 is on standby until receiving a packet transmitted from the guest OS #13 or a learning data acquisition request.

Figure 9:
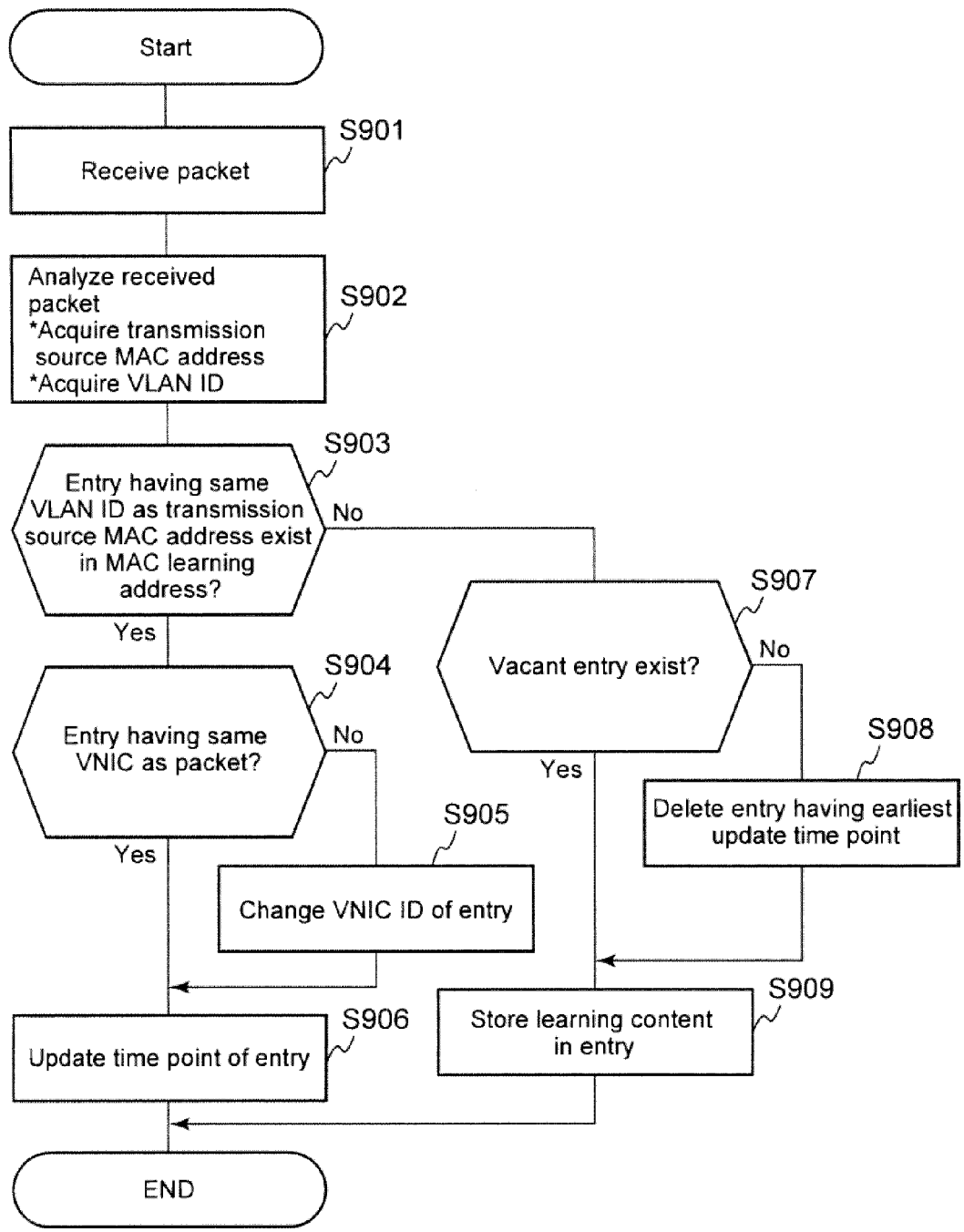
FIG. 9 shows the flow of S603 (MAC address learning processing) of FIG. 6.

(S603) When the VSW #13 receives the packet transmitted from the guest OS #13, the MAC learning part #13 performs the MAC address learning processing (see FIG. 9 for the details of the MAC address learning processing).

(S604) After performing the MAC address learning processing, the VSW #13 transmits the received packet. The packet is output from the physical computer #1 via the NIC #12 coupled to the VSW #13.

Figure 10:
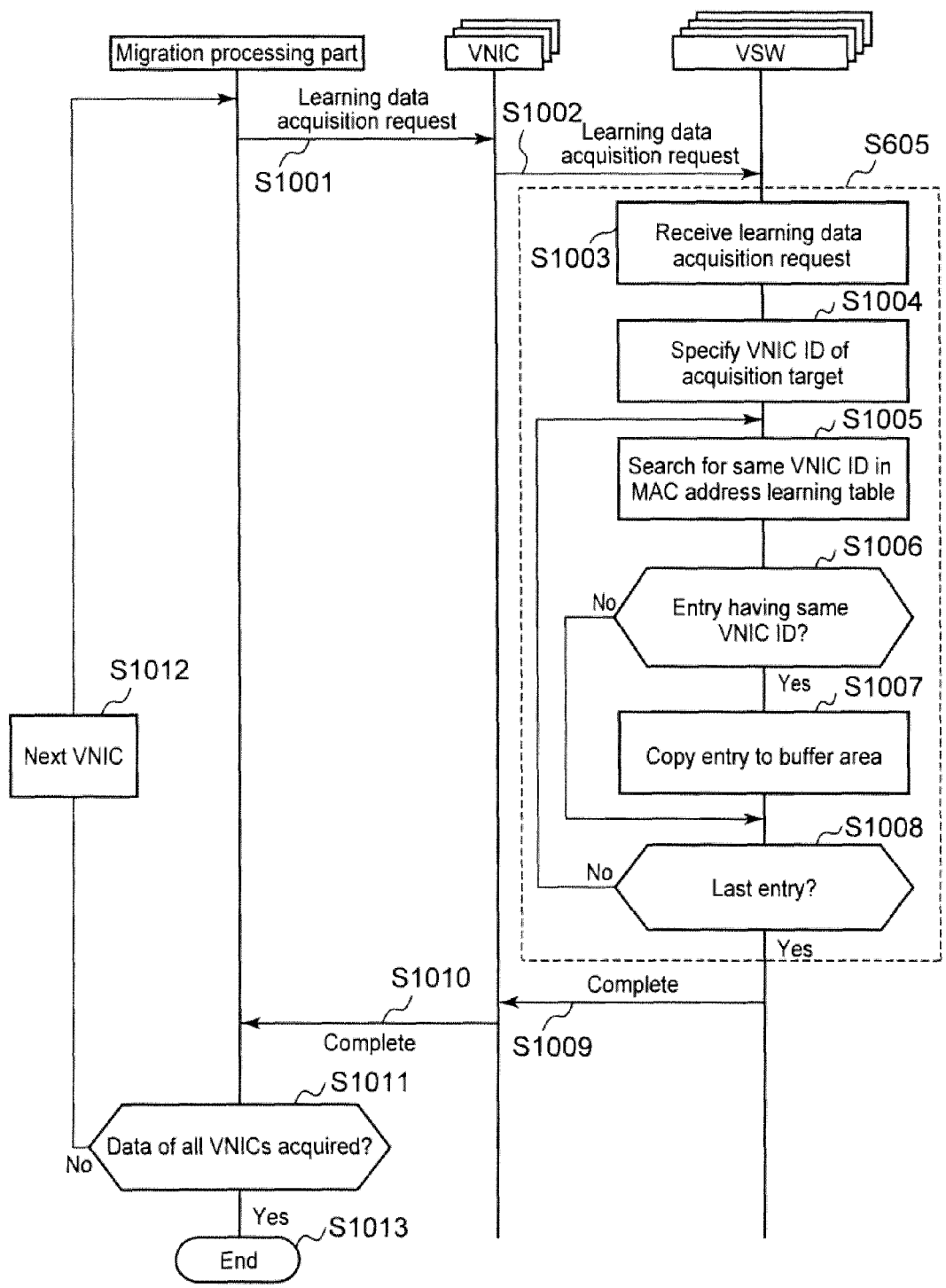
FIG. 10 shows the flow of learning data collection processing.

(S605) When receiving the learning data acquisition request, the VSW #13 performs the learning data acquisition processing (see FIG. 10 for the details of learning data collection processing including the learning data acquisition processing).

(S606) The VSW #13 acquires learning data and transmits the acquired learning data to the source (the VNIC) that has transmitted the learning data acquisition request.

As described above, when the hypervisor 103 operates and the VSW 137 exists, each of the VSWs 137 repeatedly performs the processing of S602 to S604 of FIG. 6 at all times. The processing of S605 and S606 is performed when the LM processing is performed.

Figures 7, 8:
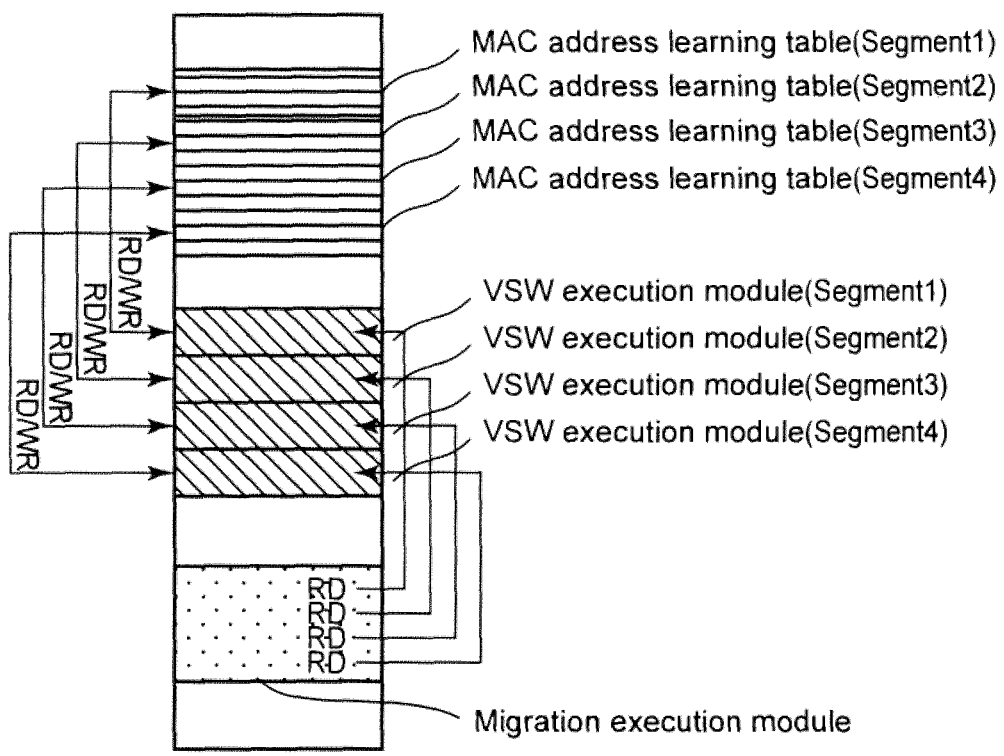
FIG. 7 shows a configuration example of a MAC address learning table 144.
FIG. 8 shows an area occupied by information on the hypervisor 103 in a memory 111.

FIG. 7 shows a configuration example of the MAC address learning table 144.

As described above, the MAC address learning table 144 exists for each of the VSWs 137 and has one or more entries. One entry has, for example, a transmission source MAC address extracted from a packet received by the VSW 137 having the MAC address learning table 144, a VLAN ID extracted from the packet, the ID of the VNIC that serves as the source having transmitted the packet, and an update time point that serves as a time point at which the entry has been updated. That is, each of the entries uses the ID of the VNIC instead of the virtual MAC address of the VNIC to specify the VNIC. For the VNIC, the virtual MAC address of the VNIC may be registered.

In order to restore the network connection of the live-migrated LPAR 128 in the physical computer #2 that serves as the LM destination, the hypervisor #2 (the migration processing part #2) outputs an RARP packet. As described with reference to FIG. 5, the RARP packet requires a transmission source MAC address and a VLAN ID (if a tag VLAN is used). Information on all the entries related to the live-migrated LPAR is migrated to the hypervisor #2 that serves as the LM destination from the MAC address learning table 144 in the hypervisor #1 that serves as the LM source. Thus, even if the guest OS #13 has transmitted a packet including a MAC address different from a virtual MAC address managed by the hypervisor #1 (and a tag VLAN has been used), the entries (the entries of the MAC address learning table) transmitted from the LM source store information required for the restoration of the network connection and included in the RAPR packet. Therefore, since the hypervisor #2 (the migration processing part #2) that serves as the LM destination outputs the RARP packet including such information, the network connection of the live-migrated LPAR can be restored.

The MAC address learning table 144 is generated when the hypervisor 103 performs the initialization processing of the VSW 137, and exists at all times during the existence of the VSW 137. A user specifies which of the generated VSWs (the virtual network segments) is used by a guest OS 134. The update of the MAC address learning table 144 is performed when information on the packet used by the guest OS 134 is updated.

FIG. 8 shows an area occupied by information on the hypervisor 103 in the memory 111.

As shown in FIG. 8, the MAC address learning tables 144 and the VSWs 137 that logically maintain the tables 144 (exactly, the program modules executed by the CPUs 104 to implement functions as the VSWs 137) are arranged in the memory 111. Thus, even if the guest OS 134 generate and transmits a large amount of packet, the MAC address learning processing can be performed without requiring a long time. Although the external apparatus of the physical computer #1 such as the management console 149 may have the MAC address learning tables 144, data is required to be transferred via a communication network. Therefore, when the guest OS 134 generates and transmits a large amount of packet, a Long time is required to analyze and update the data.

FIG. 9 shows the flow of S603 (the MAC address learning processing) of FIG. 6.

The MAC address learning processing is processing performed by the MAC learning part 140 of the VSW #137 during the existence of the VSW 137 regardless of the LM. Were, as in FIG. 6, the processing shown in FIG. 9 will be described taking the VSW #13 as an example.

(S901) The MAC learning part #13 receives a packet transmitted from the guest OS #13.

(S902) The MAC learning part #13 analyzes the received packet and acquires information from the packet based on whether the guest OS #13 uses a tag VLAN. Specifically, if the tag VLAN is used, the acquired information includes a transmission source MAC address and a VLAN ID. If the tag VLAN is not used the acquired information includes the transmission source MAC address. The use of the tag VLAN can be determined based on, for example, whether the next two bytes of the second field (the transmission source MAC address) of the packet include TPID "0x8100."

(S903) The MAC learning part #13 determines whether an entry (that will be referred to as the same entry in the description of FIG. 9) including the same MAC address (and the same VLAN ID) as the acquired transmission source MAC address (and the VLAN ID) exists in the MAC address learning table #13.

(S904) If the determination result of S903 is positive (Yes in S903), the MAC learning part #13 determines whether the VNIC ID same as the VNIC ID of the transmission source of the packet received in S901 has been registered in the same entry.

(S905) If the determination result of S904 is negative (No in S904), the MAC learning part #13 changes the VNIC ID of the same entry to the VNIC ID of the transmission source of the packet received in S901. Thus, even if the same MAC address is used by different VNICs at, for example, the Teaming, the used VNIC can be found.

(S906) If the determination result of S904 is positive (No in S904) or after S905, the MAC learning part #13 updates the update time point of the same entry to the time point at which the same entry has been updated.

(S907) If the determination result of S903 is negative (No in S903) the MAC learning part #13 determines whether a vacant entry exists in the MAC address learning table #13.

(S908) If the determination result of S907 is negative (No in S907), the MAC learning part #13 deletes an entry having the earliest update time point from the MAC address learning table #13 to generate a vacant entry.

(S909) If the determination result of S907 is positive (No in S907) or after S908, the MAC learning part #13 stores in the vacant entry the information acquired (the information learned) in S902, the VNIC ID of the transmission source of the packet received in S901, and the update time point at which the information is stored in the vacant entry.

FIG. 10 shows the flow of the learning data collection processing.

As a precondition for describing the learning data collection processing, the MAC address learning table 144 has a plurality of entries and each of the entries includes a VNIC ID as shown in FIG. 7. The VNIC ID is information for identifying a VNIC as its name implies and corresponds to the VNIC on a one-to-one basis.

In order to restore the network connection of the live-migrated LPAR 128, it is required that information on an entry having a VNIC ID corresponding to a VNIC allocated to the LPAR that serves as a LM target be acquired and the hypervisor #2 that serves as a LM destination transmit an PRP packet using the MAC address and the VLAN ID of the entry. When the entry of the VNIC allocated to the LPAR is searched from the MAC address learning table, the VNIC ID is used as a key. When a plurality of VNICs is allocated to the LPAR, it is required to acquire information on a plurality of entries. In addition, the LPAR 128 that serves as the LM target may use a tag VLAN. In this case, it is required to acquire information on a plurality of entries for one VNIC. Hereinafter, as in FIGS. 6 and 9, the learning data collection processing shown in FIG. 10 will be described taking a case, in which the LPAR 128 that serves as the LM target is the LPAR #13 and live-migrated from the physical computer #1 to the physical computer #2, as an example.

(S1001) The migration processing part #1 issues a learning data acquisition request to one VNIC 137 (for example, #11) among one or more VNICs 137 allocated to the LPAR #13.

(S1002) The VNIC #11 receives the learning data acquisition request of S1001 and transmits the received learning data acquisition request to the VSW #13 coupled to the VNIC #11.

(S1003) The VSW #13 receives the data collection request.

(S1004) The VSW #13 specifies the VNIC ID of the VNIC #11.

(S1005) The VSW #13 searches for an entry (that will be referred to as the same entry in the description of FIG. 10) having the same VNIC ID as the VNIC ID specified in S1004 from the MAC address learning table #13.

(S1006) The VSW #13 determines whether the searched entry expresses the same entry.

(S1007) If the determination result of S1006 is positive (Yes in S1006), the VSW #13 copies information on the same entry to the buffer area of the migration processing part #1 (for example, the certain area of the memory 11). Thus, the migration processing part #1 is allowed to transfer data on the LPAR #13 to the LM destination that serves as the LM destination.

(S1008) If the determination result of S1006 is negative (No in S1006) or after S1007, the VSW #13 determines whether the searched entry is the last entry. If the determination result is negative (No in S1008), the search processing of S1005 is performed for other unsearched entries.

(S1009) If the determination result of S1008 is positive (Yes in S1008), the VSW #13 notifies the VNIC #11 that serves as the source having transmitted the request received in S1003 of the acquisition completion of the data.

(S1010) The VNIC #11 having received the notification of the acquisition completion of the data notifies the migration processing part #1 that serves as the source having transmitted the request in S1001 of the acquisition completion of the data.

(S1011) The migration processing part #1 having received the notification of the acquisition completion of the data from the VNIC #11 determines whether the acquisition of data has been completed for all the one or more VNICs 137 allocated to the LPAR #13 that serves as the LM target.

(S1012) If the determination result of S1011 is negative (No in S1011), the migration processing part #1 issues a learning data acquisition request to another VNIC (for example, #12) among the one or more VNICs 137 allocated to the LPAR #13 as in S1001.

(S1013) If the determination result of S1011 is positive (Yes in S1011), the migration processing part #1 ends the learning data collection processing.

Figure 11:
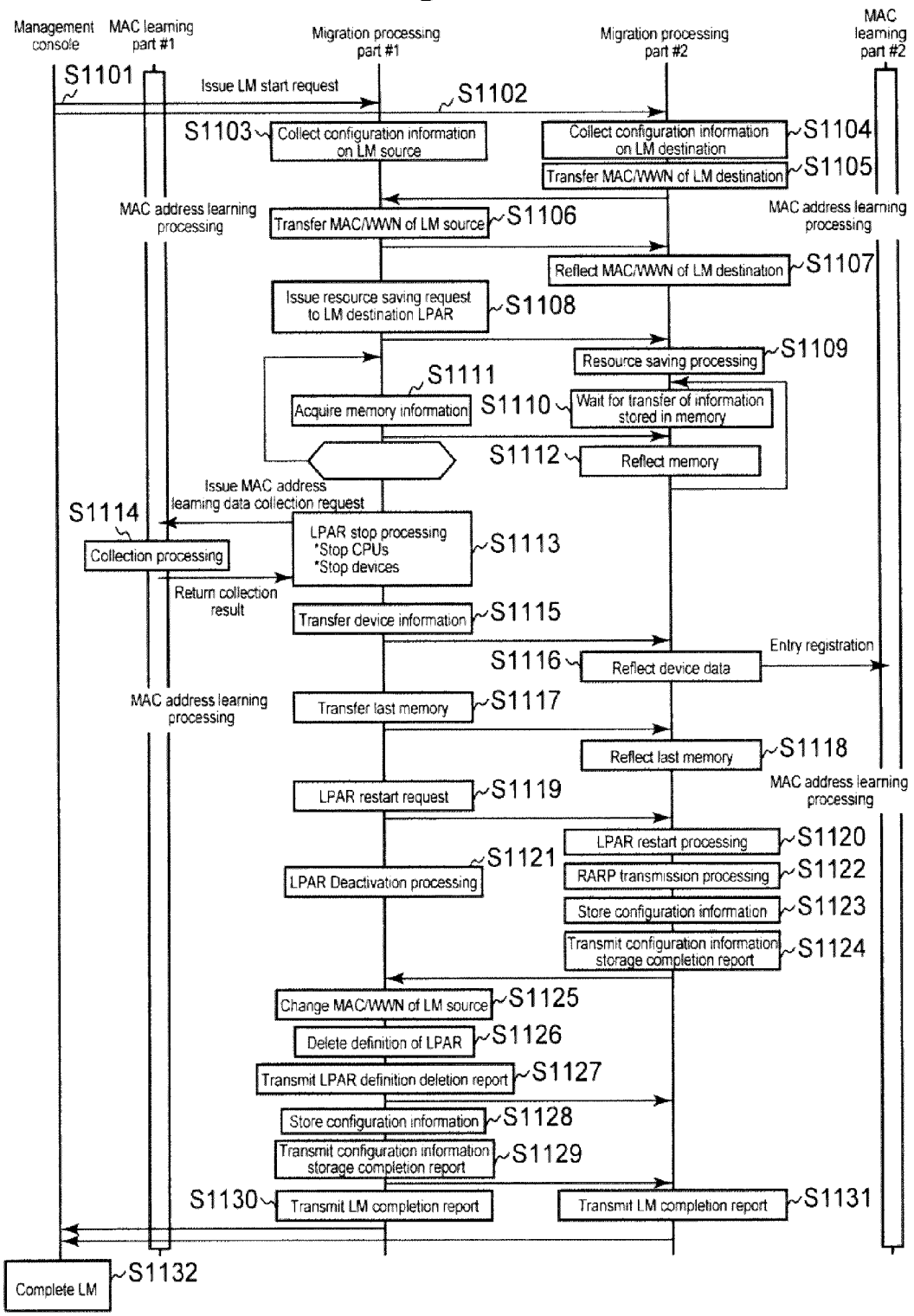
FIG. 11 shows the flow of LM processing.

FIG. 11 shows the flow of live migration processing. In the above description, the LPAR 128 is live-migrated from the physical computer #1 to the physical computer #2. To be exact, however, the LM processing is that data on the LPAR that serves as the LM source of the physical computer #1 is transferred from the physical computer #1 to the physical computer #2 and data on the LPAR as the LM destination of the physical computer #2 is changed to the data on the LPAR that serves as the LM source of the physical computer #1. Therefore, in the following description, the terms "LM source LPAR" and "LM destination LPAR" will be used. In the LM processing, it is assumed that the LPAR #3 is migrated from the LM source LPAR to the LM destination LPAR.

(S1101) The management console 149 issues a LM start request to the migration processing part #1 of the physical computer #1 that serves as the LM source.

(S1102) The management console 149 issues a LM start request to the migration processing part #2 of the physical computer #1 that serves as the LM destination.

(S1103) The migration processing part #1 collects configuration information on the physical computer #1 that serves as the LM source. The configuration information may include, for example, a virtual MAC address for each VNIC and a WWN (World Wide Name) for each VHBA, indicating the coupling relationship between each VNIC 124 and each port of the NIC 112 via each VSW 137.

(S1104) The migration processing part #2 collects configuration information on the physical computer #2 that serves as the LM destination.

(S1105) The migration processing part #2 transfers, among the configuration information acquired in S1104, the MAC address and/or the WWN of the LM destination LPAR to the migration processing part #1.

(S1106) The migration processing part #1 transfers, among the configuration information acquired in S1103, the MAC address and/or the WWN of the LM source LPAR to the migration processing part #2.

(S1107) The migration processing part #2 receives the MAC address and/or the WWN transmitted from the migration processing part #1 in S1106 and changes the MAC address and/or the WWN of the LM destination LPAR to the received MAC address and/or the WWN.

(S1108) The migration processing part #1 issues a resource saving request to the migration processing part #2.

(S1109) The migration processing part #2 receives the resource saving request from the migration processing part #1 and performs the resource saving processing of the LM destination LPAR.

(S1110) The migration processing part #2 having saved its resource waits for the transfer of information stored in the VMEM 123 from the migration processing part #1.

(S1111) The migration processing part #1 acquires information on the LM source LPAR from the VMEM 123 and transfers the acquired information to the migration processing part 42. The migration processing part #1 continues to transfer the information on the LM source LPAR until the dirty ratio of the information on the LM source LPAR stored in the VMEM 123 becomes a certain value or less. Note that the dirty ratio is the ratio of the amount of dirty information among the information on the LM source LPAR to the amount of the information on the LM source LPAR. The dirty information is information updated after being transferred in the LM processing and required to be transferred.

(S1112) The migration processing part #2 changes, among the information on the VMEM of the hypervisor #2, information on the LM destination LPAR to the information transferred from the migration processing part #1 (the information on the LM source LPAR).

(S1113) The migration processing part #1 stops the LM source LPAR when the dirty ratio becomes the certain value or less. Specifically, the migration processing part #1 stops the virtual resources (such as the VCPUs 119 and the VNICs 124) allocated to the LM source LPAR to stop the LM source LPAR. Thus, the information on the LM source LPAR among the information on the VMEM can be determined, and the dirty information can be prevented from increasing.

(S1114) After the stop of the LM source LPAR, the learning data collection processing (see FIG. 10) is performed. The processing includes the issuance of a learning data acquisition request to the VNIC coupled to the LM source LPAR by the migration processing part #1. With this processing, the migration processing part #1 can acquire data (software MAC and a VLAN ID) obtained by learning the LM source LPAR. Specifically, as in S1007 of FIG. 10, information on one or more entries of the MAC address learning table 144 is copied to the buffer area of the migration processing part #1.

(S1115) The migration processing part #1 transfers device information, i.e., information including the information (the information on the one or more entries of the MAC address learning table 144) copied to the buffer area of the migration processing part #1, to the migration processing part #2.

(S1116) The migration processing part #2 receives the device information transferred from the migration processing part #1 in S1115 and reflects the received device information on the LM destination LPAR. Specifically, the migration processing part #2 stores the information (the MAC address, the VLAN ID, and the update time point) other than the VNIC ID of the received device information in each of the one or more entries corresponding to the ID of the VNIC of the LM destination LPAR in the MAC address learning table of the VSW coupled to the VNIC of the LM destination LPAR.

By the processing described above, changes shown in FIGS. 12 and 13 occur before and after the LM, for example, before S1113 and after S1116.

That is, for example, when the ID of the VNIC allocated to the LM source LPAR is "1" as shown on the left side of FIG. 12, all the entries including the VNIC ID "1" become vacant as shown on the right side of FIG. 12 after the LM. On the other hand, as shown on the left side of FIG. 13, the information (the MAC address, the VLAN ID, and the update time point) other than the VNIC ID "1" of the received device information is stored in the entries corresponding to the VNIC (the VNIC of the ID "9") allocated to the LM destination LPAR. In the stored entries, the VNIC ID is "9."

(S1117) The migration processing part #1 transfers the last memory after transferring the device information. For example, all the remaining dirty information on the LM source LPAR is transferred to the migration processing part #2.

(S1118) The migration processing part #2 performs the reflection of the last memory. For example, the migration processing part #2 stores the received dirty information in the VMEM of the hypervisor #2.

(S1119) The migration processing part #1 issues an LPAR restart request specifying the live migrated LPAR to the migration processing part #2.

(S1120) The migration processing part #2 receives the LPAR restart request and performs LPAR restart processing to restart the guest OS 131 stopped in the LM source according to the request.

(S1121) The migration processing part #1 performs the deactivation processing of the LM source LPAR.

(S1122) The migration processing part #2 searches for an entry corresponding to the VNIC allocated to the LM destination LPAR from the MAC address learning table of the VSW coupled to the LM destination LPAR and transmits an RARP packet including the MAC address (and the VLAN ID) of the searched entry in a broadcasting form. Thus, as shown in FIGS. 14 and 15, when the PSW #1 having the MAC address table #1 including the same MAC address (and the VLAN ID) as the MAC address (and the VLAN ID) of the RARP packet receives the RARP packet, it changes the ID "port B" of the physical port corresponding to the MAC address to the ID "port D" of the physical port having received the RARP packet at this time. That is, by the broadcasting transmission of the RARP packet, the PSW 154 can be notified of the fact that the network path has been changed. Note that although the broadcasting transmission of the RARP packet is performed to change the MAC address table 148 of the PSW 154 in the embodiment, the MAC address table 148 of the PSW 154 may be changed using any type of packet other than the RARP packet.

(1123) The migration processing part #2 stores the configuration information on the LM destination LPAR. Although the configuration information on the LPAR may be stored in a memory, it is stored in an SVP (Service Processor) that serves as a computer to maintain or manage the physical computer 101 in the embodiment. The SVP may be common to the plurality of physical computers 101 or provided for each of the physical computers 101. For example, in S1123, the configuration information on the LPAR is stored in the SVP of the physical computer #2.

(S1124) The migration processing part #2 transmits a configuration information storage completion report to the migration processing part #1.

(S1125) The migration processing part #1 receives the configuration information storage completion report and configures the MAC address and/or the WWN transmitted from the migration processing part #2 in S1105 as the MAC address and/or the WWN of the LM source LPAR.

(S1126) The migration processing part #1 deletes the definition of the LM source LPAR (for example, information on the LM source LPAR in the resource management part #1).

(S1127) The migration processing part #1 transmits an LPAR definition deletion report to the migration processing part #2.

(S1128) The migration processing part #1 stores the configuration information on the LM source LPAR. For example, in S1128, the configuration information on the LPAR is stored in the SVP of the physical computer #1.

(S1129) The migration processing part #1 transmits a configuration information storage completion report to a LM destination migration processing part 172 after completing the storage of the configuration information.

(S1130) The migration processing part #1 transmits a LM completion report to the management console 149 after transmitting the configuration information storage completion report to the migration processing part #2.

(S1131) The migration processing part #2 receives the configuration information storage completion report from the migration processing part #1 and transmits a LM completion report to the management console 149.

(S1132) The management console 149 completes the LM after receiving the LM completion reports from both of the migration processing parts #1 and #2.

According to the embodiment described above, the network connection of the live migrated LPAR can be restored without the manual input of a MAC address or a VLAN ID by a manager even under an environment in which communication is performed using the MAC address or the VLM ID outside the jurisdiction of the hypervisor 103. Since the manager is not required to manually input the MAC address or the VLAN ID outside the jurisdiction of the hypervisor 103, the user of the LPAR or its upper-level machine and the manager of the hypervisor 103 do not cooperate each other to input the information, In addition, when the plurality of VSWs 137 corresponding to a plurality of network segments is constructed by the hypervisor 103, the MAC address management table 144 exists for each of the VSWs 137. Therefore, the hypervisor #1 manages the plurality of MAC address management tables 144. Even under such a configuration, learning data is collected from the VSW via the VNIC allocated to the LPAR 128 that serves as a LM target, whereby data on the LPAR 128 that does not serve as the LM target can be prevented from being transferred to a LM destination.

The embodiment is described above. However, the present invention is not limited to the embodiment and may be, of course, modified in various ways without departing from its spirit. For example, although the embodiment is described taking the communication via the VNIC as an example, the same processing may be performed by other types of virtual I/O devices (for example, VHBAs). In addition, a virtualization mechanism such as the hypervisor 103 may be realized as a computer program or realized as an object. For example, the hypervisor is an apparatus having a storage device storing a computer program, a communication interface device for communicating with an external apparatus such as a physical computer, and a control device coupled to the storage device and the communication interface device and including a processor, and may realize the function as the hypervisor when the processor of the control device executes the computer program. In addition, at least one of the scheduler 117, the resource management part 118, and the migration processing part 148 of the hypervisor 103 may be realized by a hardware circuit, or a part of the processing of at least one of the elements 117, 118, and 148 may be realized by the hardware circuit.

REFERENCE SIGNS LIST

101 Physical Computer
103 Hypervisor
128 LPAR (Virtual Computer)
137 VSW (Virtual Switch)
140 MAC Learning Part
144 MAC Learning Table

The invention claimed is:

1. A virtual computer system comprising:
a first physical computer
having a first physical resource including one or more first physical I/O (Input/Output) devices coupled to one or more physical network switches and
having a first virtualization mechanism capable of constructing one or more virtual computers by allocating one or more first virtual resources, which are obtained by logically partitioning the first physical resource, to one or more first LPARs (Logical Partitions), respectively; and
a second physical computer
having a second physical resource including one or more second physical I/O devices coupled to the one or more physical network switches and
having a second virtualization mechanism capable of constructing one or more virtual computers by allocating one or more second virtual resources, which are obtained by logically partitioning the second physical resource, to one or more second LPARs, respectively,
(A) wherein the first virtualization mechanism has a first management information unit and is configured to
extract a certain type of information from a packet when receiving the packet from the virtual computer and
register the extracted certain type of information in the first management information unit,
(B) wherein the first virtualization mechanism is configured to transmit the certain type of information in the first management information unit to the second virtualization mechanism during live migration in which a target virtual computer, which is a virtual computer that is in operation and to be migrated, is migrated from the first physical computer to the second physical computer, and (C) wherein the second virtualization mechanism has a second management information unit, and is configured to
 receive the certain type of information from the first virtualization mechanism,
 register the received certain type of information in the second management information unit, and
 transmit a certain type of packet including the certain type of information from at least one of the one or more second physical I/O devices,
wherein the certain type of information is at least one of a MAC address and a VLAN (Virtual LAN) tag.

2. The virtual computer system according to claim 1,
wherein the one or more first virtual resources include one or more first virtual I/O devices based on the one or more first physical I/O, and the one or more second virtual resources include one or more second virtual I/O devices based on the one or more second physical I/O,
wherein the first virtualization mechanism has one or more first virtual switches to which the one or more first virtual I/O devices allocated to the one or more virtual computers, respectively, managed by the first virtualization mechanism and at least one of the one or more first physical I/O devices are coupled,
wherein the second virtualization mechanism has one or more second virtual switches to which the one or more second virtual I/O devices allocated to the one or more virtual computers, respectively, managed by the second virtualization mechanism and at least one of the one or more second physical I/O devices are coupled,
wherein each of the first virtual switches has the first management information unit, and each of the second virtual switches has the second management information unit,
wherein, for (A), the first virtualization mechanism is configured to register the certain type of information included in the received packet in a first management information unit of the first virtual I/O devices having received the packet from the virtual computer via the first virtual I/O devices of the virtual computer,
wherein, for (B), the first virtualization mechanism is configured to transmit, during the live migration, a target information segment including the certain type of information to the second virtualization mechanism, correspondingly to at least the first virtual I/O devices of the target virtual computer of the first management information unit of the first virtual switch through which the packet output from the first virtual I/O devices of the target virtual computer goes, and
wherein, for (C), the second virtualization mechanism is configured to register the target information segment in the second management information unit of the second virtual switch coupled to the second virtual I/O device of the migrated target virtual computer and transmit the certain type of packet including the certain type of information in the target information segment from the second physical I/O device coupled to the second virtual switch to which the second virtual I/O device of the target virtual computer is coupled.

3. The virtual computer system according to claim 2,
wherein each of the management information units has registered therein a device ID of the virtual I/O device coupled to the virtual switch having the management information unit and the certain type of information in the packet received via the virtual I/O device.

4. The virtual computer system according to claim 3,
wherein, for (A), when information same as the extracted certain type of information is registered in the first management information unit of the first virtual switch having received the packet and the virtual I/O device identified from the device ID corresponding to the registered information is different from the first virtual I/O device serving as a transmission source of the packet, the first virtualization mechanism is configured to update the device ID corresponding to the registered information in the first management information unit of the first virtual switch having received the packet, to the ID of the first virtual I/O devices serving as the transmission source of the packet.

5. The virtual computer system according to claim 1,
wherein the certain type of information is the MAC address, the certain type of packet is an RARP (Reverse Address Resolution Protocol) request,
wherein the RARP packet includes the MAC address, each of the physical network switches has address management information expressing a corresponding relationship between a physical port ID and the MAC address, and is configured, when receiving the packet, to register a combination of a target MAC address and a target physical port ID in the address management information when the target MAC address does not exist in the address management information and is configured to update the physical port ID corresponding to the target MAC address in the address management information to the target physical port ID when the target MAC address exists in the address management information and the physical port ID corresponding to the target MAC address is different from the target physical port ID,
wherein the target MAC address is the MAC address of the received packet, and
wherein the target physical port is the physical port having received the packet.

6. The virtual computer system according to claim 5,
wherein the certain type of information and the RARP packet include a VLAN tag as well as the MAC address,
wherein the address management information expresses a corresponding relationship between the MAC address, the physical port ID, and at least a part of a VLAN tag segment,
wherein each of the physical network switches is configured, when receiving the packet, to register a combination of the target MAC address, a target VLAN tag segment, and the target physical port ID in the address management information when the target MAC address does not exist in the address management information and is configured to register a combination of the target MAC address, the target VLAN tag segment, and the target physical port in a new entry of the address management information when the target MAC address exists in the address management information and the VLAN tag segment corresponding to the target MAC address is different from the target VLAN tag segment, and
wherein the target VLAN tag segment is at least a part of the VLAN tag of the received packet.

7. The virtual computer system according to claim 1,
wherein, for the above item (B), the first virtualization mechanism is configured to stop the virtual resource allocated to the target virtual computer and then transmit the certain type of information in the first management information unit to the second virtualization mechanism.

8. A virtualization mechanism that is executed by a physical computer having a physical resource including one or more physical I/O (Input/Output) devices coupled to one or more physical network switches, and that is capable of constructing one or more virtual computers by allocating one or more virtual resources, which are obtained by logically partitioning the physical resource, to one or more LPARs (Logical Partitions), the virtualization mechanism comprising:
- a migration processing part capable of executing live migration in which a target virtual computer serving as a virtual computer, which is in operation and to be migrated, is migrated from the physical computer to another physical computer;
- a management information unit; and
- a learning part configured to extract a certain type of information from a packet received from the virtual computer and register the extracted certain type of information in the management information unit,
- wherein the migration processing part is configured to, during the live migration, acquire the certain type of information from the management information unit and transmit the acquired certain type of information to the other physical computer,
- wherein the certain type of information is at least one of a MAC address and a VLAN (Virtual LAN) tag.

9. A physical computer comprising:
- a physical resource including one or more physical I/O (Input/Output) devices coupled to one or more physical network switches, a processor, and a storage device,
- wherein execution of a virtualization mechanism by the processor allows construction of one or more virtual computers by means of allocation of one or more virtual resources, which are obtained by logically partitioning the physical resource, to one or more LPARs (Logical Partitions) and allows execution of live migration in which a target virtual computer serving as the virtual computer, which is in operation and to be migrated, is migrated from the physical computer to another physical computer,
- wherein the storage device is configured to store management information unit,
- wherein the processor is configured to extract a certain type of information from a packet received from the virtual computer and register the extracted certain type of information in the management information unit,
- wherein the processor is configured to transmit the certain type of information in the management information unit to the other physical computer during the live migration, and
- wherein the certain type of information is at least one of a MAC address and a VLAN (Virtual LAN) tag.

* * * * *